(12) United States Patent
Sehgal

(10) Patent No.: US 12,001,566 B2
(45) Date of Patent: Jun. 4, 2024

(54) METHOD AND SYSTEM FOR GENERATING SECURITY FINDINGS ACQUISITION RECORDS FOR SYSTEMS AND SYSTEM COMPONENTS

(71) Applicant: Dell Products L.P., Round Rock, TX (US)

(72) Inventor: Sameer Sehgal, Round Rock, TX (US)

(73) Assignee: DELL PRODUCTS L.P., Round Rock, TX (US)

(*) Notice: Subject to any disclaimer, the term of this patent is extended or adjusted under 35 U.S.C. 154(b) by 447 days.

(21) Appl. No.: 17/490,188

(22) Filed: Sep. 30, 2021

(65) Prior Publication Data

US 2023/0112966 A1 Apr. 13, 2023

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .................................................. G06F 21/577
See application file for complete search history.

(56) References Cited

U.S. PATENT DOCUMENTS

| | | | | |
|---|---|---|---|---|
| 9,679,131 | B2* | 6/2017 | Striem Amit | ........... G06F 21/55 |
| 10,192,179 | B1 | 1/2019 | Agarwal | |
| 2004/0010709 | A1* | 1/2004 | Baudoin | ................ G06Q 40/08 726/1 |
| 2014/0201843 | A1* | 7/2014 | Hibbert | ............... H04L 63/1433 726/25 |

(Continued)

FOREIGN PATENT DOCUMENTS

WO 2009087489 A1 7/2009

OTHER PUBLICATIONS

"CxSAST API Guide for CxSAST Versions Before v9.4.0." Checkmarx Knowledge Center—Confluence, <https://checkmarx.atlassian.net/wiki/spaces/KC/pages/5767170/CxSAST+API+Guide+for+CxSAST+Versions+Before +v9.4.0>, Available in 2021, as a publication, Accessed on May 1, 2023 (2 pages).

(Continued)

*Primary Examiner* — Khang Do

(74) *Attorney, Agent, or Firm* — Chamberlain, Hrdlicka, White, Williams & Aughtry; Aly Z. Dossa

(57) ABSTRACT

Techniques described herein relate to a method for generating security findings acquisition (SFA) records. The method includes obtaining, by a security finding acquisition system (SFAS) orchestrator, an entity context request associated with an entity; making a first determination, by the SFAS orchestrator, that the entity is not associated with an entity directed acyclic graph (DAG); in response to the first determination: obtaining, by the SFAS orchestrator, the entity DAG associated with the entity from a lineage builder; making a second determination, by the SFAS orchestrator, that the entity is not associated with SFA anchors; in response to the second determination: obtaining, by the SFAS orchestrator, the SFA anchors associated with the entity from a resolver; obtaining, by the SFAS orchestrator, the SFA records associated with the entity from an extractor using the SFA anchors; and performing, by the SFAS orchestrator, security actions using the SFA records.

18 Claims, 8 Drawing Sheets

(56) References Cited

U.S. PATENT DOCUMENTS

| | | | |
|---|---|---|---|
| 2015/0013011 A1* | 1/2015 | Brucker | G06F 21/577 726/25 |
| 2016/0171505 A1 | 6/2016 | Johri et al. | |
| 2017/0200006 A1* | 7/2017 | Gershoni | G06Q 50/10 |
| 2018/0018465 A1* | 1/2018 | Carey | G06F 21/50 |
| 2018/0075038 A1* | 3/2018 | Azvine | G06F 16/22 |
| 2019/0188390 A1* | 6/2019 | Gunn | G06N 5/025 |
| 2020/0027094 A1 | 1/2020 | Consalvo et al. | |
| 2020/0202008 A1* | 6/2020 | Pfleger de Aguiar | G06F 11/3485 |
| 2020/0364638 A1 | 11/2020 | Molloy et al. | |
| 2021/0012017 A1* | 1/2021 | Wu | G06F 21/14 |
| 2022/0067746 A1 | 3/2022 | Thakkar | |
| 2022/0094789 A1 | 3/2022 | Lau et al. | |
| 2022/0129257 A1 | 4/2022 | Touati et al. | |
| 2022/0210202 A1* | 6/2022 | Crabtree | G06F 16/2477 |
| 2022/0269548 A1* | 8/2022 | Dwivedi | G06F 11/3006 |

OTHER PUBLICATIONS

"Docker HUB API (beta)." Docker Hub API Reference, Mar. 24, 2021, website <https://docs.docker.com/docker-hub/api/latest/#tag/Images>, retrieved from Internet Archive Wayback Machine <https://web.archive.org/web/20240204030620/https://docs.docker.com/docker-hub/api/latest/#tag/Images> on May 1, 2023 (30 pages).

"Getting Started." Bridegecrew, Sep. 16, 2021, website <https://docs.bridgecrew.io/reference/getting-started#getting-started>, retrieved from Internet Archive Wayback Machine <https://web.archive.org/web/20231129014527/https://docs.bridgecrew.io/reference/getting-started#getting-started> on Mar. 25, 2022 (2 pages).

"Using the API Explorer.", Harbor, Jun. 16, 2021, website <https://goharbor.io/docs/2.2.0/working-with-projects/using-api-explorer/>, retrieved from Internet Archive Wayback Machine <https://web.archive.org/web/20230923110856/https://goharbor.io/docs/2.2.0/working-with-projects/using-api-explorer/> on Apr. 25, 2023 (2 pages).

"Plans API." HashiCorp Developer, Jul. 2, 2018, website <https://developer.hashicorp.com/terraform/cloud-docs/api-docs/plans>, retrieved from Internet Archive Wayback Machine <https://web.archive.org/web/20231212044309/https://developer.hashicorp.com/terraform/cloud-docs/api-docs/plans> on Apr. 25, 2023 (6 pages).

"INSIGHTVM API (V3)." Dec. 3, 2017, website <https://help.rapid7.com/insightvm/en-us/api/>, retrieved from Internet Archive Wayback Machine <https://web.archive.org/web/20220419185418/https://help.rapid7.com/insightvm/en-us/api/> on Mar. 25, 2022 (453 pages).

"JFrog REST APIs." JFrog Help Center, Aug. 1, 2021, webpage <https://jfrog.com/help/r/jfrog-rest-apis/xray-rest-apis>, retrieved from Internet Archive Wayback Machine <https://web.archive.org/web/20230326114225/https://www.jfrog.com/confluence/display/JFROG/Xray+REST+API> on Apr. 25, 2023 (510 pages).

"Kubernetes API." Kubernetes, Apr. 17, 2019, website <https://kubernetes.io/docs/reference/kubernetes-api/>, retrieved from Internet Archive Wayback Machine <https://web.archive.org/web/20240118091427/https://kubernetes.io/docs/reference/kubernetes-api/> on Apr. 25, 2023 (589 pages).

"Opencontainers." GitHub, Jul. 21, 2021, website <https://github.com/opencontainers/image-spec/blob/main/annotations.md>, retrieved from Internet Archive Wayback Machine <https://web.archive.org/web/20240000000000*/https://github.com/opencontainers/image-spec/blob/main/annotations.md> on Mar. 25, 2022 (4 pages).

"Repositories API." GitLab, May 18, 2016, website <https://docs.gitlab.com/ee/api/repositories.html>, retrieved from Internet Archive Wayback Machine <https://web.archive.org/web/20240111074050/https://docs.gitlab.com/ee/api/repositories.html> on Mar. 25, 2022 (7 pages).

"Repositories." GitHub Docs, Sep. 1, 2021, webpage <https://docs.github.com/en/rest/repos?apiVersion=2022-11-28>, retrieved from Internet Archive Wayback Machine <https://web.archive.org/web/20210901153326/https://docs.github.com/en/rest/reference/repos> on Mar. 25, 2022 (99 pages).

"Rest API." HCL Software, Aug. 12, 2020, website <https://help.hcltechsw.com/appscan/ASoC/appseccloud_rest_apis.html>, retrieved from Internet Archive Wayback Machine <https://web.archive.org/web/20240000000000*/https://help.hcltechsw.com/appscan/ASoC/appseccloud_rest_apis.html> on Mar. 25, 2022 (2 pages).

"Azure Resource Manager." Microsoft, Jun. 15, 2021, webpage <https://learn.microsoft.com/en-us/rest/api/resources/>, retrieved from Internet Archive Wayback Machine <https://web.archive.org/web/20210615000439/https://docs.microsoft.com/en-us/rest/api/?term=resource%20manager> on Mar. 25, 2022 (3 pages).

"Working With Sentinel JSON Result Data." HashiCorp Developer, <https://developer.hashicorp.com/terraform/cloud-docs/policy-enforcement/sentinel/json>, Available in 2021, as a publication, Accessed on Mar. 25, 2022 (4 pages).

* cited by examiner

METHOD AND SYSTEM FOR GENERATING SECURITY FINDINGS ACQUISITION RECORDS FOR SYSTEMS AND SYSTEM COMPONENTS

BACKGROUND

Computing devices may provide services. To provide the services, the computing devices may include hardware components and software components. The hardware components and software components may be configured to provide the services. The hardware components and software components may be associated with security findings during the configuration and operation of the hardware components and the software components. The security findings may be important to users of the computing devices.

SUMMARY

In general, certain embodiments described herein relate to a method for generating security findings acquisition (SFA) records. The method may include obtaining, by a security finding acquisition system (SFAS) orchestrator, an entity context request associated with an entity; in response to obtaining the entity context request: making a first determination, by the SFAS orchestrator, that the entity is not associated with an entity directed acyclic graph (DAG); in response to the first determination: obtaining, by the SFAS orchestrator, the entity DAG associated with the entity from a lineage builder; making a second determination, by the SFAS orchestrator, that the entity is not associated with SFA anchors; in response to the second determination: obtaining, by the SFAS orchestrator, the SFA anchors associated with the entity from a resolver; obtaining, by the SFAS orchestrator, the SFA records associated with the entity from an extractor using the SFA anchors; and performing, by the SFAS orchestrator, security actions using the SFA records.

In general, certain embodiments described herein relate to a non-transitory computer readable medium that includes computer readable program code, which when executed by a computer processor enables the computer processor to perform a method for generating security findings acquisition (SFA) records. The method may include obtaining, by a security finding acquisition system (SFAS) orchestrator, an entity context request associated with an entity; in response to obtaining the entity context request: making a first determination, by the SFAS orchestrator, that the entity is not associated with an entity directed acyclic graph (DAG); in response to the first determination: obtaining, by the SFAS orchestrator, the entity DAG associated with the entity from a lineage builder; making a second determination, by the SFAS orchestrator, that the entity is not associated with SFA anchors; in response to the second determination: obtaining, by the SFAS orchestrator, the SFA anchors associated with the entity from a resolver; obtaining, by the SFAS orchestrator, the SFA records associated with the entity from an extractor using the SFA anchors; and performing, by the SFAS orchestrator, security actions using the SFA records.

In general, certain embodiments described herein relate to a system for generating security findings acquisition (SFA) records. The system may include a production environment that includes entities. The system may also include a security findings acquisition system (SFAS) orchestrator of a SFAS, which may include a processor and memory, and is programmed to obtain an entity context request associated with an entity of the entities; in response to obtaining the entity context request: make a first determination that the entity is not associated with an entity directed acyclic graph (DAG); in response to the first determination: obtain the entity DAG associated with the entity from a lineage builder; make a second determination that the entity is not associated with SFA anchors; in response to the first determination: obtain the SFA anchors associated with the entity from a resolver; obtain the SFA records associated with the entity from an extractor using the SFA anchors; and perform security actions using the SFA records.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
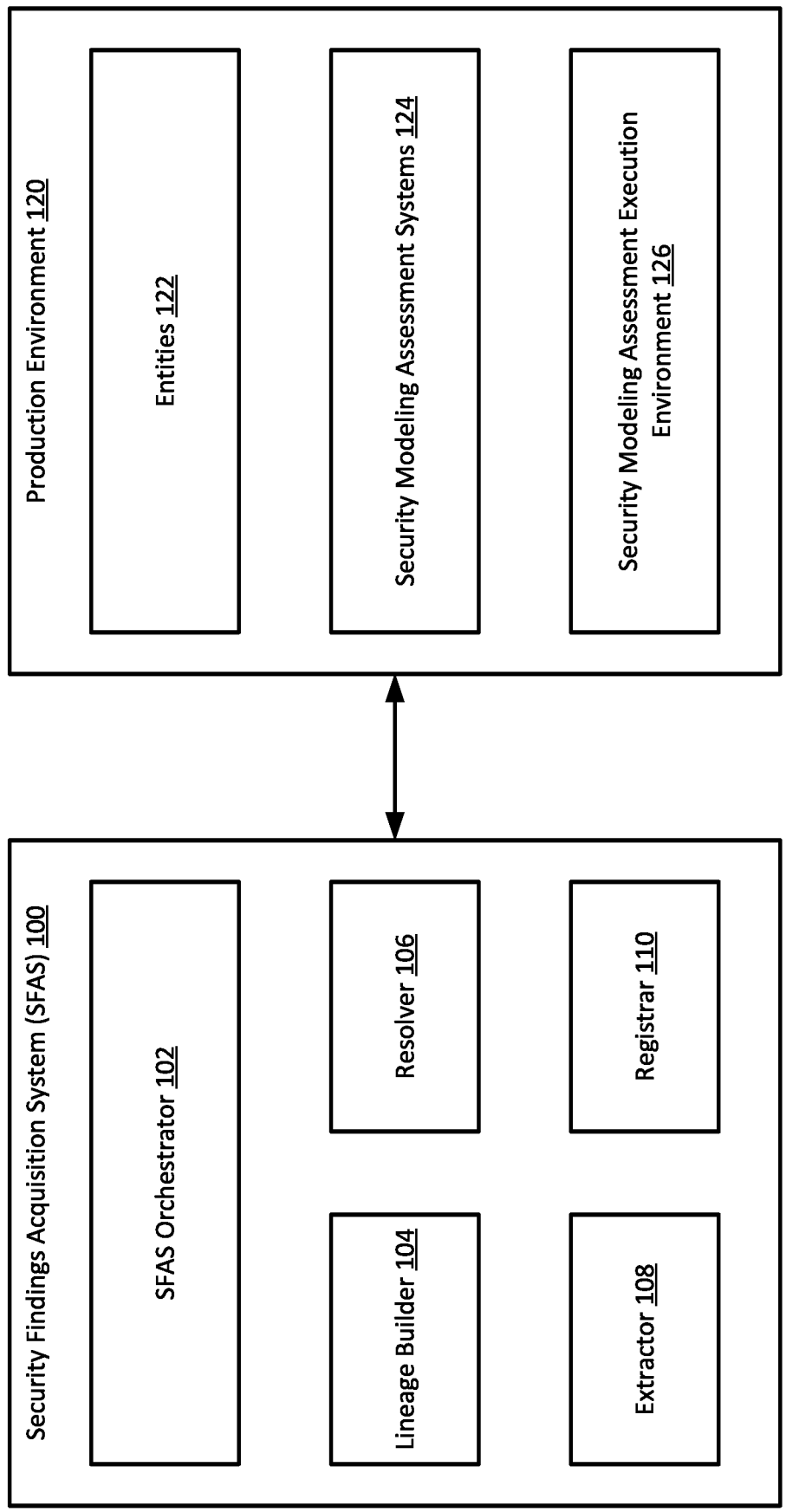
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to methods, systems, and non-transitory computer readable mediums for generating security findings acquisition (SFA) records for entities hosted in a production environment.

In one or more embodiments of the invention, entities (e.g., instantiable image, deployed application, etc.) may be developed in the production environment. The development of such entities may be divided into one or more stages of development. Such stages of development may include, for example, designing, coding, building, integrating, testing, deploying, and monitoring an entity. At each stage of the development of an entity, security activities and/or issues may arise. Therefore, it may be important to a user of the entity to obtain security information associated with each stage of development of an entity to reliably determine entity security. Each stage of the development of the entity may be associated with one or more different security assessments performed by one or more different security assessment applications. As a result, extracting security information from the multitude of security assessment applications for all the different stages of development of an entity may be a complex process for user.

To address, at least in part, the aforementioned problems that may arise when obtaining security information associated with each stage of the lifecycle of an entity, in one or more embodiments of the invention, a security findings acquisition system (SFAS) generates SFA records associated with each stage of development in the lifecycle of an entity. In one or more embodiments of the invention, a SFAS orchestrator of an SFAS may obtain entity context associated with a targeted entity for which SFA records are to be generated. The SFAS orchestrator may initiate a lineage builder of the SFAS to generate an entity directed acyclic graph (DAG) using entity relationship data obtained from a security modeling assessment execution environment associated with the targeted entity. The entity DAG may be associated with the targeted entity in which each entity corresponding to a previous and/or subsequent stage in the lifecycle of development of the targeted is associated with a node of the entity DAG.

In one or more embodiments of the invention, a resolver of the SFAS may use the entity DAG to generate SFA anchors. The resolver may obtain security modeling assessment systems connection data associated with security modeling assessment systems. The security modeling assessment systems may perform one or more security assessments on each entity included in the entity DAG. The security model assessment systems connection data included in the SFA anchors enables an extractor of the SFAS to obtain security assessment data from the security modeling assessment systems. The extractor then associates the security assessment data with the data nodes corresponding to the entities for which the security assessment data is associated to generate the SFA records. The SFA records may be efficiently generated with minimal user involvement using security assessment data obtained from any number of security modeling assessment systems. As a result, security information may be obtained for not only the targeted entity, but all entities corresponding to previous and/or subsequent stages in the lifecycle of development of the targeted entity, thereby increasing the reliability of the SFA records and providing a more complete view of the security of the targeted entity.

FIG. 1 shows a diagram of a system in accordance with one or more embodiments of the invention. The system may include a security findings acquisition system (SFAS) (100) and a production environment (120). That may include other and/or additional devices and/or components without departing from the invention. The devices and components of the system illustrated in FIG. 1 may be operatively connected via any combinations of wired (e.g., Ethernet) and/or wireless (e.g., WAN) connections without departing from the invention. Each of the aforementioned components of the system of FIG. 1 is discussed below.

In one or more embodiments of the invention, the production environment (120) is implemented as one or more computing devices. In one or more embodiments, a computing device is any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors (not shown) for obtaining data, and/or any combination thereof. For additional information regarding computing devices, refer to FIG. 4.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyperconverged infrastructure, a cluster, a virtual machine, a logical container (e.g., for one or more applications), and/or any other type of device with the aforementioned requirements.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments of the invention, the production environment (120) includes the functionality to configure and/or host entities (122). An entity may refer to an application, a deployed infrastructure, and/or a system. A system may include any number and/or combinations of applications and/or deployed infrastructures. An application may include any type of application (e.g., database application, inferencing application, electronic communication application, etc.) without departing from the invention. A deployed infrastructure (e.g., Kubernetes environment, Docker environment, etc.) may include any type of deployed infrastructure without departing from the invention. A deployed infrastructure may include any infrastructure components (e.g., networking devices, virtual machines, storages, virtual storages, etc.) without departing from the invention. An application and/or a deployed infrastructure may be implemented as computer instructions, which when executed by a computing resource (e.g., processor, accelerator, etc.) of the production environment (120), causes the production environment to provide the functionality of the application and/or deployed infrastructure. A system may include any combination of applications and deployed infrastructures without departing from the invention.

In one or more embodiments of the invention, an entity may be associated with a portion of the lifecycle associated with the entity. In other words, an entity may be associated with one or more entities of previous stages or subsequent stages of the lifecycle of the entity. For example, an entity of a deployed application may be associated with: (i) an entity of an instantiable image associated with the application, (ii) an entity of a committed code associated with the application, (iii) an entity of a project associated with the application, and (iv) an entity of a system in which the application is a component. There may be entities associated with other and/or additional stages of the lifecycle of an entity (e.g., data structures such as data flow diagrams, process flow charts, etc.) without departing from the invention.

In one or more embodiments of the invention, users of the production environment (120) (e.g., DevOps engineers, site reliability engineers, etc.) may develop entities (122) in stages. Such stages may include designing, coding, building, integrating, testing, deploying, monitoring, and/or redeploying. There may be other and/or additional stages of development of entities (122) without departing from the invention. To ensure the reliability of the entities, security information (i.e., SFA records) may be generated and/or extracted for each entity and each stage of the entity, which may provide users of the production environment (120) an indication of the security of the entity.

In one or more embodiments of the invention, to obtain the aforementioned security information associated with the entities (122), the production environment (120) includes security modeling assessment systems (124) and a security modeling assessment execution environment (126). The production environment (120) may include other and/or additional components to obtain security information without departing from the invention. Each of the aforementioned components of the production environment (120) is discussed below.

In one or more embodiments of the invention, the security modeling assessment systems (124) include the functionality to monitor and/or test entities (122) to obtain, generate, and/or extract security information associated with the entities (122). The security modeling assessment systems may include any appropriate applications and/or programs for monitoring and/or testing entities (122) to obtain, generate, and/or extract security information associated with the entities (122) without departing from the invention. Different security modeling assessment systems may be used to monitor and/or test different types of entities (122) to obtain, generate, and/or extract security information associated with the different types of entities (122) without departing from the invention. The security modeling assessment systems may include, for example, Threatmodeler, spreadsheets, Checkmarx, Fortify, Coverity, Checkov, Terrascan, Black Duck, Xray, Prisma Twistlock, Aquasec, HCL Appscan, Microfocus Webinspect, Prisma Cloud, Nessus, Qualys, Nexpose, or other and/or additional programs or applications with the functionality to monitor and/or test entities (122) to obtain, generate, and/or extract security information associated with the entities (122) without departing from the invention.

In one or more embodiments of the invention, the security modeling assessment execution environment (126) includes the functionality to host and/or execute the security modeling assessment systems (124). The security modeling assessment execution environment (126) may include any components and/or resources that may be required to host the security modeling assessment systems (124) without departing from the invention. For example, the security modeling assessment execution environment (126) may include an integrated development environment (IDE), a project repository (e.g., a Git repository), software development and lifecycle management applications and/or services (e.g., GitHub, Azure, GitLab, Azure DevOps, etc.), and the computing devices and/or computing resources (i.e., see computing devices discussed above) required to host, execute, and/or manage the security modeling assessment execution environment (126). The security modeling assessment execution environment (126) may include other and/or additional components and/or resources without departing from the invention.

In one or more embodiments of the invention, the SFAS (100) is implemented as one or more computing devices. For additional information regarding computing devices, refer to the above discussion and/or FIG. 4.

In one or more embodiments of the invention, the SFAS (100) includes the functionality to generate security findings acquisition (SFA) records (not shown) associated with entities (122) of the production environment (120). To generate SFA records, the SFAS (100) and/or components of the SFAS (100) may include the functionality to communicate, share, and/or obtain data from the production environment (120) and/or production environment components (e.g., 124, 126). The SFAS (100) may include other and/or additional functionalities without departing from the invention.

In one or more embodiments of the invention, an SFA record is one or more data structures that includes security information associated with each node within an entity directed acyclic graph (DAG) (discussed below) associated with, and including, an entity. Each node of the entity data included in the SFA record may be associated with security information. The security information may include one or more assessment blocks. The assessment blocks may include assessment findings and assessment metadata. The assessment findings may include the results of one or more security assessments performed on entity. The assessment results may include any information associated with the security of the entity as determined by the assessments without departing from the invention. The assessment results may include, for example, indications of whether an entity is secure, potential security threats associated with the entity, any unauthorized activity associated with the entity, or other and/or additional assessment results without departing from the invention.

The assessment metadata may include any information associated with the assessments performed on an entity without departing from the invention. The assessment metadata may include, for example, an assessment type (e.g., threat modeling, image security assessment, static code assessment, fuzz testing, etc.), a timestamp (i.e., a date and time when an assessment was performed), an assessor type that specifies what type of assessor performed the assessment (e.g., a user, security assessment application, etc.), an assessor identifier (e.g., a unique combination of bits associated with a particular assessor (e.g., user). The assessment metadata may include other and/or additional information associated with the assessments performed on an entity without departing from the invention.

As discussed above, the SFAS (100) may include the functionality to generate SFA records associated with entities (122) of the production environment (120). To provide the aforementioned functionality, the SFAS (100) may include an SFAS orchestrator (102), a lineage builder (104), a resolver (106), an extractor (108), and a registrar (110). The SFAS (100) may include other and/or additional components without departing from the invention. Each of the aforementioned components of the SFAS (100) is discussed below.

In one or more embodiments of the invention, the SFAS orchestrator (102) is a physical device. The physical device may include circuitry. The physical device may be, for example, a field-programmable gate array, application specific integrated circuit, programmable processor, microcontroller, digital signal processor, or other hardware processor. The physical device may be programmed to provide the functionality of the SFAS orchestrator (102) described throughout this application.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments of the invention, the SFAS orchestrator (102) is implemented as computer instructions, e.g., computer code, stored on a persistent storage that when executed by a processor of the SFAS (100) causes the SFAS (100) to provide the functionality of the SFAS orchestrator (102) described throughout this application.

Figure 2A:
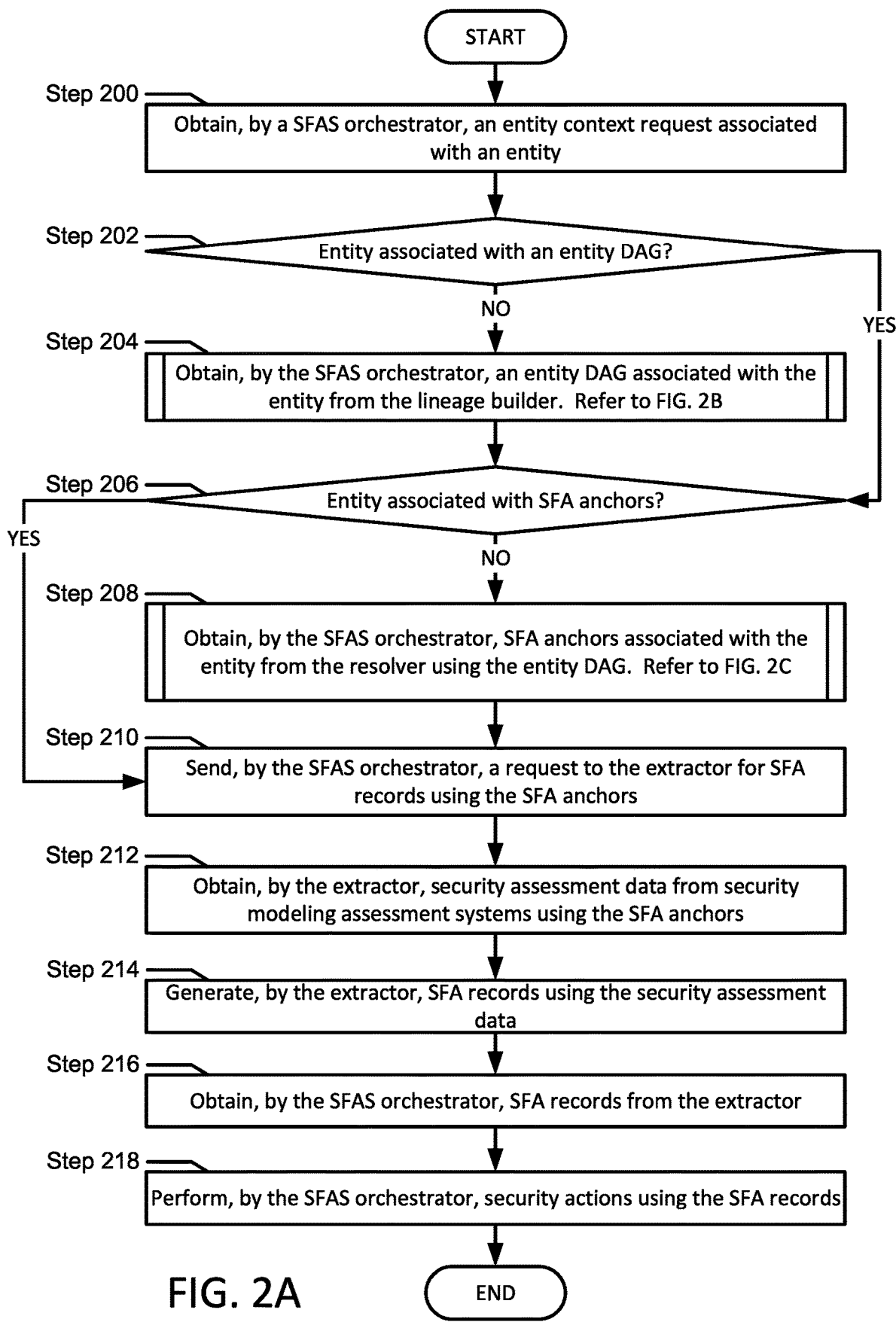
FIG. 2A shows a flowchart of a method in accordance with one or more embodiments of the invention.

In one or more embodiments of the invention, the SFAS orchestrator (102) includes the functionality to orchestrate the generation of SFA records and perform all, or any portion of, the method depicted in FIG. 2A. To orchestrate the generation of SFA records, the SFAS orchestrator (102) may further include the functionality to send requests to the lineage builder (104), the resolver (106), and the extractor (108) to perform their respective functionalities. The SFAS orchestrator (102) may further include the functionality to communicate, provide and obtain data (e.g., entity contexts, entity DAGs, SFA anchors, and SFA records, etc.) from the lineage builder (104), the resolver (106), and the extractor (108). The SFAS orchestrator (102) may further include the functionality to obtain entity context requests from users of the system to generate SFA records associated with an entity. The SFAS orchestrator (102) may also perform security actions using SFA records. The SFAS orchestrator (102) may include other and/or additional functionalities without departing from the invention. For additional information regarding the functionality of the SFAS orchestrator, refer to FIG. 2A.

In one or more embodiments of the invention, the lineage builder (104) is a physical device. The physical device may include circuitry. The physical device may be, for example, a field-programmable gate array, application specific integrated circuit, programmable processor, microcontroller, digital signal processor, or other hardware processor. The physical device may be programmed to provide the functionality of the lineage builder (104) described throughout this application.

In one or more embodiments of the invention, the lineage builder (104) is implemented as computer instructions, e.g., computer code, stored on a persistent storage that when executed by a processor of the SFAS (100) causes the SFAS (100) to provide the functionality of the lineage builder (104) described throughout this application.

Figure 2B:
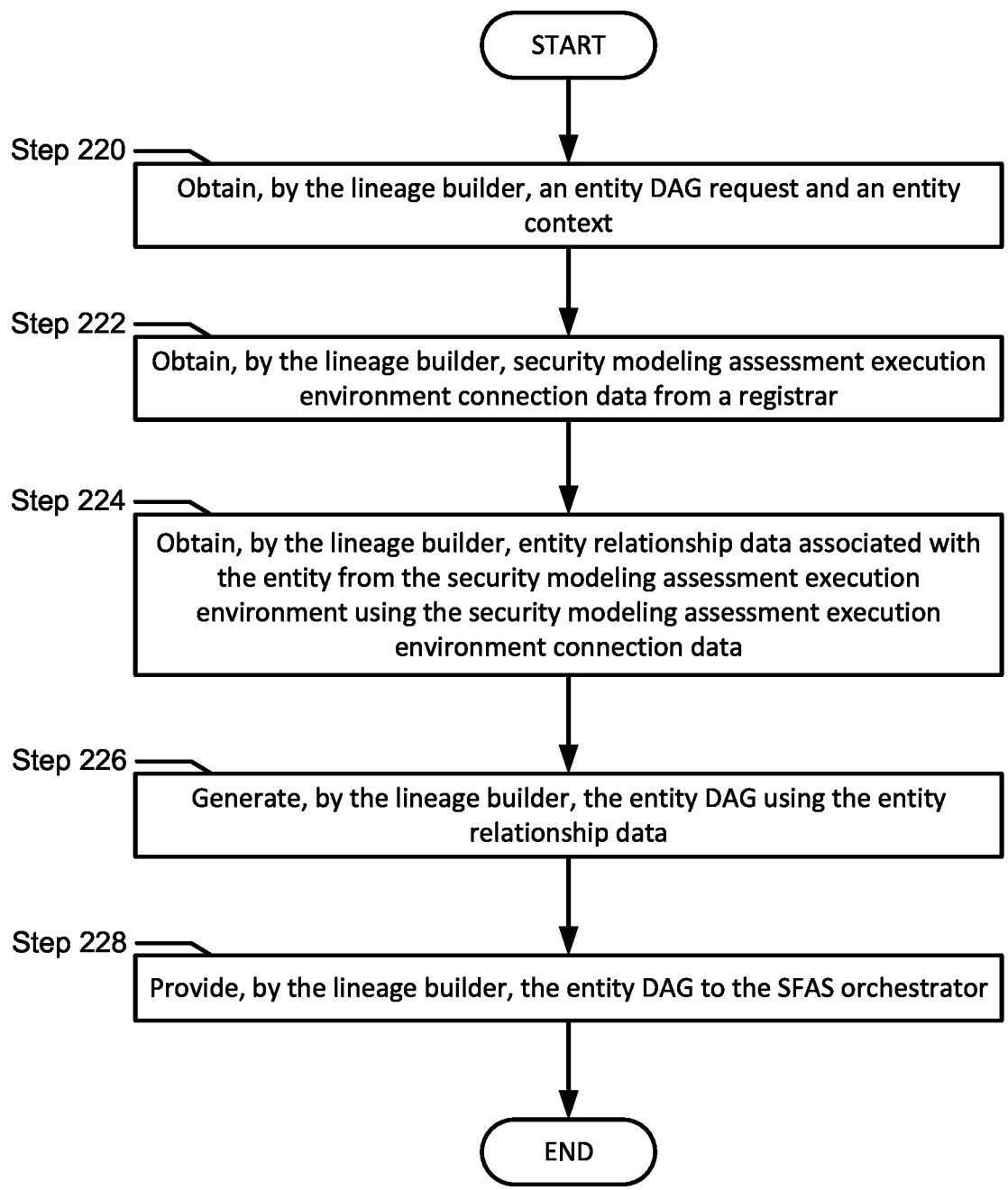
FIG. 2B shows a flowchart of a method in accordance with one or more embodiments of the invention.

In one or more embodiments of the invention, the lineage builder (104) includes the functionality to generate entity DAGs associated with entities and to perform all, or any portion of, the method depicted in FIG. 2B. To generate entity DAGs, the lineage builder (104) may obtain entity context DAG requests and entity context from the SFAS orchestrator (102). The lineage builder (104) may further include the functionality to request and obtain: (i) security modeling assessment execution environment connection data from the registrar (110) and (ii) entity relationship data from the security modeling assessment execution environment using the security modeling assessment execution environment connection data. The lineage builder (104) may also include the functionality to generate an entity DAG using the entity relationship data. The lineage builder (104) may provide the entity DAG to the SFAS orchestrator (102). The lineage builder (104) may include other and/or additional functionalities without departing from the invention.

In one or more embodiments of the invention, an entity DAG is one or more data structures that includes a hierarchical relationship associated with the lifecycle of a targeted entity. More specifically, each node included in the entity DAG may be associated with a stage of the lifecycle of the targeted entity, including the targeted entity. The entity DAG may include nodes associated with all entities representing previous and/or subsequent stages of the lifecycle of the entity for which the entity DAG was generated (i.e., the targeted entity). The entity DAG may include the entity identifier (e.g., a unique combination of bits associated with a particular entity of the production environment (120)) associated with each entity that is related to the targeted entity. The entity DAG may include any number of nodes associated with any number of entities that may be associated with any stage in the lifecycle of the targeted entity. Entity DAGs may be used by the resolver (106) to generate SFA anchors. The entity DAG may include other and/or additional information associated with the targeted entity without departing from the invention.

For example, an entity DAG associated with an instantiable application image may include a node associated with: (i) the instantiable application image (i.e., the targeted entity), (ii) committed computer code used to generated the instantiable application image, (iii) a project repository associated with the project which the instantiable application image is associated, (iv) a system for which the project is associated (all previous stages of the lifecycle of the instantiable application image), and (v) a deployed application associated with the instantiable application image (a subsequent stage of the lifecycle of the instantiable application image).

Returning to the discussion of the system of FIG. 1, in one or more embodiments of the invention, the resolver (106) is a physical device. The physical device may include circuitry. The physical device may be, for example, a field-programmable gate array, application specific integrated circuit, programmable processor, microcontroller, digital signal processor, or other hardware processor. The physical device may be programmed to provide the functionality of the resolver (106) described throughout this application.

In one or more embodiments of the invention, the resolver (106) is implemented as computer instructions, e.g., computer code, stored on a persistent storage that when executed by a processor of the SFAS (100) causes the SFAS (100) to provide the functionality of the resolver (106) described throughout this application.

Figure 2C:
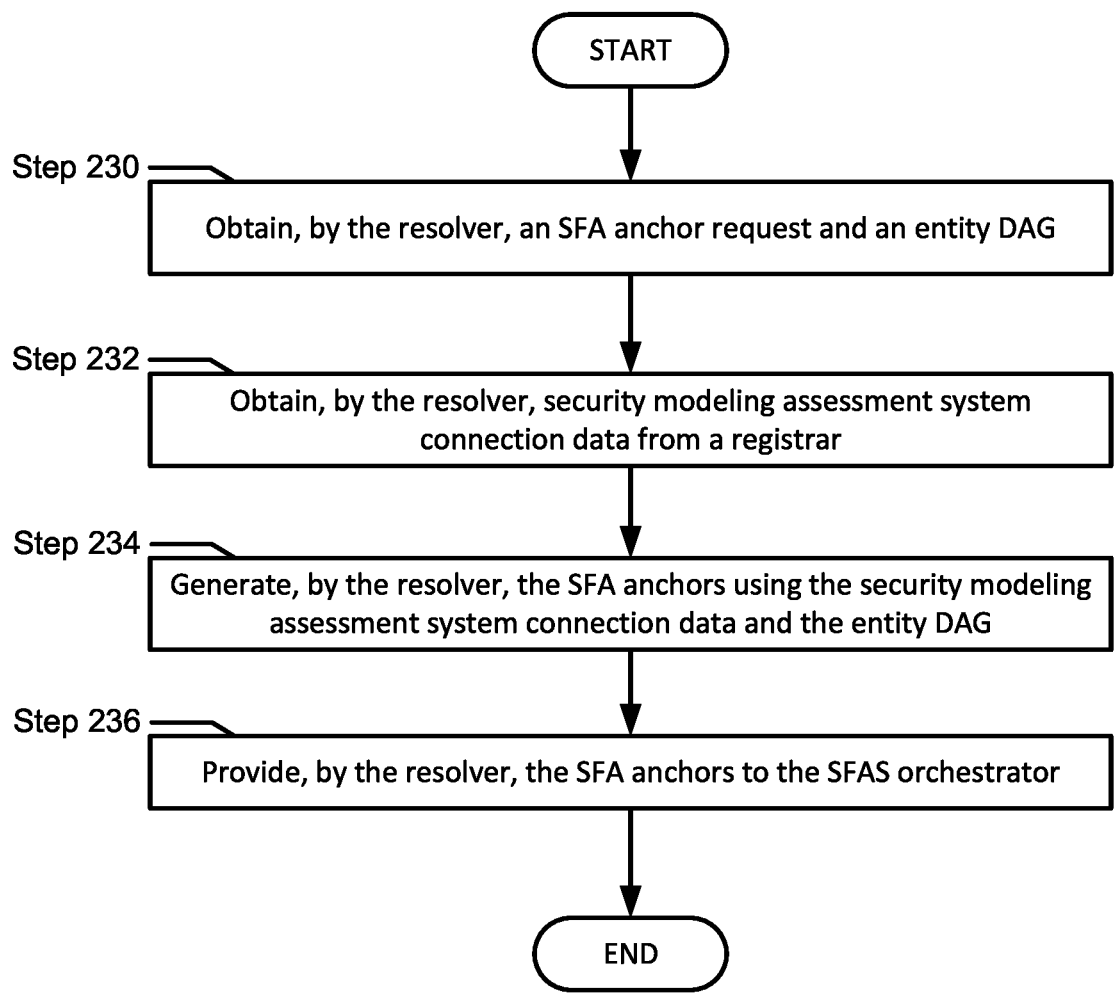
FIG. 2C shows a flowchart of a method in accordance with one or more embodiments of the invention.

In one or more embodiments of the invention, the resolver (106) includes the functionality to generate SFA anchors using entity DAGs associated with entities and to perform all, or a portion of, the method depicted in FIG. 2C. To generate SFA anchors, the resolver (106) may obtain SFA anchor requests and entity DAGs from the SFAS orchestrator (102). The resolver (106) may further include the functionality to request and obtain security modeling assessment system connection data from the registrar (110). The resolver (106) may also include the functionality to generate the SFA anchors using the security modeling assessment systems connection data and provide the SFA anchors to the SFAS orchestrator (102). The resolver (106) may include other and/or additional functionalities without departing from the invention.

In one or more embodiments of the invention, the SFA anchors are one or more data structures that include the entity DAG with security modeling assessment systems connection data. Each node (i.e., entity) in the entity DAG is appended and/or otherwise associated with security modeling assessment systems connection data associated with each security modeling assessment system associated with the entity. The security modeling assessment system connection data may include any information (e.g., network addresses, security modeling assessment system identifiers, API calls, port numbers, etc.) that may be used to communicate, request, and obtain assessment findings from the security modeling assessment systems without departing from the invention. The SFA anchors may be used by the extractor (108) to obtain SFA records. The SFA anchors may include other and/or additional information without departing from the invention.

In one or more embodiments of the invention, the extractor (108) is a physical device. The physical device may include circuitry. The physical device may be, for example, a field-programmable gate array, application specific integrated circuit, programmable processor, microcontroller, digital signal processor, or other hardware processor. The physical device may be programmed to provide the functionality of the extractor (108) described throughout this application.

In one or more embodiments of the invention, the extractor (108) is implemented as computer instructions, e.g., computer code, stored on a persistent storage that when executed by a processor of the SFAS (100) causes the SFAS (100) to provide the functionality of the extractor (108) described throughout this application.

In one or more embodiments of the invention, the extractor (108) includes the functionality to generate SFA records using SFA anchors associated with entities and to perform a portion of the method depicted in FIG. 2A. To generate SFA records, the extractor (108) may obtain SFA records requests and SFA anchors from the SFAS orchestrator (102). The extractor (108) may further include the functionality to request and obtain assessment findings and assessment metadata from the security modeling assessment systems using the SFA anchors. The extractor (108) may also include the functionality to generate the SFA records using the assessment findings and assessment metadata, and provide the SFA records to the SFAS orchestrator (102). The extractor (108) may include other and/or additional functionalities without departing from the invention.

In one or more embodiments of the invention, the registrar (110) is a physical device. The physical device may include circuitry. The physical device may be, for example, a field-programmable gate array, application specific integrated circuit, programmable processor, microcontroller, digital signal processor, or other hardware processor. The physical device may be programmed to provide the functionality of the registrar (110) described throughout this application.

In one or more embodiments of the invention, the registrar (110) is implemented as computer instructions, e.g., computer code, stored on a persistent storage that when executed by a processor of the SFAS (100) causes the SFAS (100) to provide the functionality of the registrar (110) described throughout this application.

In one or more embodiments of the invention, the registrar (110) includes the functionality to maintain an address book and to perform a portion of the methods depicted in FIGS. 2B-2C. To maintain an address book, the registrar (110) may obtain security modeling assessment system connection data and security modeling assessment execution environment connection data from a user of the system when new components are added and/or modified in the security modeling assessment systems and the security modeling assessment execution environment. The registrar (110) may also periodically check the security modeling assessment systems and the security modeling assessment execution environment to identify and obtain security modeling assessment system connection data and security modeling assessment execution environment connection data associated with new and/or modified components of the security modeling assessment systems and the security modeling assessment execution environment. The registrar (110) may store the security modeling assessment system connection data and security modeling assessment execution environment connection data in the address book. The registrar (110) may provide security modeling assessment system connection data and security modeling assessment execution environment connection data to the lineage builder (104) and the resolver (106). The registrar (110) may include other and/or additional functionalities without departing from the invention.

The address book may be one or more data structures that include the security modeling assessment system connection data (e.g., network addresses, security modeling assessment system identifiers, API calls, port numbers, etc.) and security modeling assessment execution environment connection data (e.g., network addresses, security modeling assessment system identifiers, API calls, port numbers, etc.) associated with the security modeling assessment systems and the security modeling assessment execution environment respectively. The address book may be stored in one or more storage devices (not shown) of the SFAS (100). The address book may be used to provide security modeling assessment execution environment connection data to the lineage builder (104) and security modeling assessment system connection data to the resolver (106). The address book may include other and/or additional information without departing from the invention.

FIG. 2A shows a flowchart in accordance with one or more embodiments of the invention. The method depicted in FIG. 2A may be performed by a SFAS orchestrator (102, FIG. 1) of an SFAS (100, FIG. 1) to generate SFA records. All, or a portion of, the method of FIG. 2A may be performed by other components (e.g., an extractor (108)) illustrated in FIG. 1 without departing from the invention.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, an entity context request associated with an entity is obtained by the SFAS orchestrator. In one or more embodiments of the invention, a user of the system sends a message to the SFAS orchestrator. The message may include an entity context request. The message may further include entity context associated with a targeted entity. The message may include other and/or additional types of information without departing from the invention. The message may be provided to the SFAS orchestrator using any appropriate method of data transmission without departing from the invention. As an example, the user may communicate the message as network data traffic units over a series of network devices that operatively connect the user to the SFAS orchestrator. The SFAS orchestrator may obtain an entity context request associated with an entity via other and/or additional methods without departing from the invention.

The entity context may be a data structure that includes information associated with the entity for which SFA records are to be generated (i.e., the targeted entity). The entity context may include, for example, an entity type and an entity identifier (e.g., a unique combination of bits associated with a particular entity). The entity context may include other and/or additional information associated with the targeted entity without departing from the invention. The entity type may specify whether the entity is a system, a project, committed computer code, an instantiable image, a deployed application, a deployed infrastructure, or other and/or additional types of entities without departing from the invention.

In Step 202, a determination is made as to whether the entity is associated with an entity DAG. In one or more embodiments of the invention, the SFAS orchestrator checks to determine whether an entity DAG associated with the entity was previously generated and available. The SFAS orchestrator may store previously generated entity DAGs in one or more storage of the SFAS. The entity DAGs may include a timestamp associated with the point in time in which they were generated and entity identifiers associated with the entity for which they are associated. The SFAS orchestrator may check whether the previously generated entity DAGs include the entity identifier that matches the entity identifier included in the entity context. If a match is found, the SFAS orchestrator may also check a timestamp included in the previously generated entity DAG that indicates whether the previously generated entity DAG was generated before or after a configurable time period has expired, which would require the generation of a new entity DAG. If the SFAS orchestrator identifies an entity DAG that was not generated after a configurable time period has expired, then the SFAS orchestrator may determine that the entity is associated with an entity DAG. If the SFAS orchestrator does not identify an entity DAG that was not generated after a configurable time period has expired, then the SFAS orchestrator may determine that the entity is not associated with an entity DAG. The determination as to whether the entity is associated with an entity DAG may be made via other and/or additional methods without departing from the invention.

In one or more embodiments of the invention, if the entity is associated with an entity DAG, then the method proceeds to Step 206. In one or more embodiments of the invention, if the entity is not associated with an entity DAG, then the method proceeds to Step 204.

In Step 204, the SFAS orchestrator obtains an entity DAG associated with the entity from the lineage builder. For additional information regarding the generation of the entity DAG, refer to FIG. 2B.

In Step 206, a determination is made as to whether the entity is associated with SFA anchors. As discussed above, the SFA anchors may be included in the entity DAG. The SFA anchors may include security modeling assessment system connection data associated with each node of the entity DAG. The SFAS orchestrator may determine whether the entity is associated with SFA anchors by checking whether each node of the entity DAG includes or is otherwise associated with security modeling assessment system connection data. If each node of the entity DAG includes or is otherwise associated with security modeling assessment system connection data, then the SFAS orchestrator may determine that the entity is associated with SFA anchors. If each node of the entity DAG does not include or is not otherwise associated with security modeling assessment system connection data, then the SFAS orchestrator may determine that the entity is not associated with SFA anchors. The determination as to whether the entity is associated with SFA anchors may be made via other and/or additional methods without departing from the invention.

In one or more embodiments of the invention, if the entity is associated with SFA anchors, then the method proceeds to Step 210. In one or more embodiments of the invention, if the entity is not associated with SFA anchors, then the method proceeds to Step 208.

In Step 208, the SFAS orchestrator obtains SFA anchors associated with the entity from the resolver using the entity DAG. For additional information regarding the generation of the SFA anchors, refer to FIG. 2C.

In Step 210, the SFAS orchestrator sends a request to the extractor for SFA records using the SFA anchors. In one or more embodiments of the invention, SFAS orchestrator sends a message to the extractor. The message may include a request for SFA records associated with the entity. The message may further include SFA anchors associated with the targeted entity. The message may include other and/or additional information without departing from the invention. The message may be provided to the extractor using any appropriate method of data transmission without departing from the invention. As an example, the SFAS orchestrator may communicate the message as network data traffic units over a series of network devices that operatively connect the extractor to the SFAS orchestrator. The SFAS orchestrator may send a request to the extractor for SFA records using the SFA anchors via other and/or additional methods without departing from the invention.

In Step 212, the extractor obtains security assessment data from the security modeling assessment systems using the SFA anchors. In one or more embodiments of the invention, the extractor uses the security modeling assessment system connection data included the SFA anchors to send requests to each security modeling assessment system associated with each of the entities included in the SFA anchors. In response to obtaining the requests, the security modeling assessment systems may perform one or more assessments on the entities included in the SFA anchors to obtain or generate security assessment data (i.e., assessment findings and assessment metadata). In one embodiment of the invention, the security modeling assessment systems may obtain security assessment data generated from the performance of previous assessments. The security modeling assessment systems may provide the security assessment data to the extractor. The request and security assessment data may be shared between the extractor and the security modeling assessment systems using any appropriate method of data transmission without departing from the invention. As an example, the requests and the security assessment data may communicated between the extractor and the security modeling assessment systems as network data traffic units over a series of network devices that operatively connect the extractor to the security modeling assessment systems. The extractor may obtain security assessment data from the security modeling assessment systems using the SFA anchors via other and/or additional methods without departing from the invention.

In Step 214, the extractor generates SFA records using the security assessment data. The security assessment data may include assessment findings and assessment data for each assessment performed on each entity included in the SFA anchor. In one or more embodiments of the invention, the extractor includes or otherwise associates all security assessment data with a corresponding entity node included in the SFA anchors for which the security assessment data was generated to generate the SFA records. As a result, each node associated with each entity in the SFA records is associated with security assessment data. The SFA records may include assessment finding and assessment metadata for each assessment of each entity included in the SFA records. Therefore, the SFA records may indicate the security of each stage of the lifecycle of the targeted entity. The extractor may generate the SFA records using the security assessment data via other and/or additional methods without departing from the invention.

In Step 216, the SFAS orchestrator obtains the SFA records from the extractor. In one or more embodiments of the invention, the extractor sends a message to the SFAS orchestrator. The message may include the SFA records associated with the targeted entity. The message may include other and/or additional information without departing from the invention. The message may be provided to the SFAS orchestrator using any appropriate method of data transmission without departing from the invention. As an example, the extractor may communicate the message as network data traffic units over a series of network devices that operatively connect the extractor to the SFAS orchestrator. The SFAS orchestrator may obtain SFA records from the extractor via other and/or additional methods without departing from the invention.

In Step 218, the SFAS orchestrator performs security actions using the SFA records. The security actions may include, for example, providing the SFA records to a user of the system or storing the SFA records in a storage device of the SFAS. The security actions may include other and/or additional actions using the SFA records without departing from the invention. The SFAS orchestrator may perform security actions using the SFA records via other and/or additional methods without departing from the invention.

In one or more embodiments of the invention, the method ends following Step 218.

FIG. 2B shows a flowchart in accordance with one or more embodiments of the invention. The method depicted in FIG. 2B may be performed by a lineage builder (104, FIG. 1) of an SFAS (100, FIG. 1) to generate entity DAGs. All, or a portion of, the method of FIG. 2B may be performed by other components illustrated in FIG. 1 without departing from the invention.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 220, the lineage builder obtains an entity DAG request and an entity context from the SFAS orchestrator. In one or more embodiments of the invention, the SFAS orchestrator sends a message to the lineage builder. The message may include a request to generate an entity DAG associated with the targeted entity. The message may further include the entity context associated with the targeted entity. The message may include other and/or additional information without departing from the invention. The message may be provided to the lineage builder using any appropriate method of data transmission without departing from the invention. As an example, the SFAS orchestrator may communicate the message as network data traffic units over a series of network devices that operatively connect the lineage builder to the SFAS orchestrator. The lineage builder may obtain an entity DAG request and an entity context from the SFAS orchestrator via other and/or additional methods without departing from the invention.

In Step 222, the lineage builder obtains security modeling assessment execution environment connection data from a registrar. In one or more embodiments of the invention, the lineage builder sends a request to the registrar for security modeling assessment execution environment connection data. In response to obtaining the request, the registrar may obtain the latest security modeling assessment execution environment connection data from the address book and provide the security modeling assessment execution environment connection data to the lineage builder. The request and the security modeling assessment execution environment connection data may be shared between the lineage builder and the registrar using any appropriate method of data transmission without departing from the invention. The lineage builder may obtain security modeling assessment execution environment connection data from the registrar via other and/or additional methods without departing from the invention.

In Step 224, the lineage builder obtains entity relationship data associated with the entity from the security modeling assessment execution environment using the security modeling assessment execution environment connection data. In one or more embodiments of the invention, the lineage builder uses the security modeling assessment execution environment connection data to send requests for entity relationship data associated with the targeted entity to the security modeling assessment execution environment components (e.g., code repository application programming interface (API), image repository, infrastructure API, etc.) system associated with each of the entities included in the SFA anchors. In response to obtaining the requests, the security modeling assessment execution environment may identify all entities associated with previous and/or subsequent stages of the lifecycle of the targeted entity using the entity context. The security modeling assessment execution environment may generate entity relationship data based on the identified entities.

The entity relationship data may be one or more data structures that include an ordered list of entity identifiers associated with entities that are associated with stages in the lifecycle of the targeted entity. The security modeling assessment execution environment may provide the entity relationship data to the lineage builder. The requests and the entity relationship data may be shared between the lineage builder and the security modeling assessment execution environment using any appropriate method of data transmission without departing from the invention. As an example, the requests and the entity relationship data may be communicated between the lineage builder and the security modeling assessment execution environment as network data traffic units over a series of network devices that operatively connect the lineage builder to the security modeling assessment execution environment. The lineage builder may obtain entity relationship data associated with the entity from the security modeling assessment execution environment using the from the security modeling assessment execution environment using the security modeling assessment execution environment connection data via other and/or additional methods without departing from the invention.

In Step 226, the lineage builder generates the entity DAG using the entity relationship data. In one or more embodiments of the invention, the lineage builder generates a directed acyclic graph based on the ordered list of entity identifiers included in the entity relationship data. The lineage builder generates a node in the entity DAG for each entity identifier included in the entity relationship identifier. The lineage builder may include the entity identifier in the node associated with the entity. The lineage builder may generate the entity DAG using the entity relationship data via other and/or additional methods without departing from the invention.

In Step 228, the lineage builder provides the entity DAG to the SFAS orchestrator. In one or more embodiments of the invention, the lineage builder sends a message to the SFAS orchestrator. The message may include the entity DAG associated with the targeted entity. The message may include other and/or additional information without departing from the invention. The message may be provided to the SFAS orchestrator using any appropriate method of data transmission without departing from the invention. As an example, the lineage builder may communicate the message as network data traffic units over a series of network devices that operatively connect the lineage builder to the SFAS orchestrator. The lineage builder may provide the entity DAG to the SFAS orchestrator via other and/or additional methods without departing from the invention.

In one or more embodiments of the invention, the method ends following Step 228.

FIG. 2C shows a flowchart in accordance with one or more embodiments of the invention. The method depicted in FIG. 2C may be performed by a resolver (106, FIG. 1) of an SFAS (100, FIG. 1) to generate SFA anchors. All, or a portion of, the method of FIG. 2C may be performed by other components illustrated in FIG. 1 without departing from the invention.

While the various steps in the flowchart shown in FIG. 2C are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 230, the resolver obtains an SFA anchor request and an entity DAG from the SFAS orchestrator. In one or more embodiments of the invention, the SFAS orchestrator sends a message to the resolver. The message may include a request to generate SFA anchors associated with the targeted entity. The message may further include the entity DAG associated with the targeted entity. The message may include other and/or additional information without departing from the invention. The message may be provided to the resolver using any appropriate method of data transmission without departing from the invention. As an example, the SFAS orchestrator may communicate the message as network data traffic units over a series of network devices that operatively connect the resolver to the SFAS orchestrator. The resolver may obtain an SFA anchor request and an entity DAG from the SFAS orchestrator via other and/or additional methods without departing from the invention.

In Step 232, the resolver obtains security modeling assessment systems connection data from a registrar. In one or more embodiments of the invention, the resolver sends a request to the registrar for security modeling assessment systems connection data. In response to obtaining the request, the registrar may obtain the latest security modeling assessment systems connection data from the address book and provide the security modeling assessment systems connection data to the resolver. The request and the security modeling assessment connection data may be shared between the resolver and the registrar using any appropriate method of data transmission without departing from the invention. The resolver may obtain security modeling assessment system connection data from the registrar via other and/or additional methods without departing from the invention.

In Step 234, the resolver generates the SFA anchors using the security modeling assessment systems connection data. In one or more embodiments of the invention, the resolver includes or otherwise associates the security modeling assessment systems connection data to each node included in the entity DAG. Each node associated with each entity related to the targeted entity may include or otherwise be associated with security modeling assessment system connection data for security modeling assessment systems that may perform security assessments on the node. The resolver may generate the SFA anchors using the security modeling assessment systems connection data via other and/or additional methods without departing from the invention.

In Step 236, the resolver provides the SFA anchors to the SFAS orchestrator. In one or more embodiments of the invention, the resolver sends a message to the SFAS orchestrator. The message may include the SFA anchors associated with the targeted entity. The message may include other and/or additional information without departing from the invention. The message may be provided to the SFAS orchestrator using any appropriate method of data transmission without departing from the invention. As an example, the resolver may communicate the message as network data traffic units over a series of network devices that operatively connect the resolver to the SFAS orchestrator. The resolver may provide the SFA anchors to the SFAS orchestrator via other and/or additional methods without departing from the invention.

In one or more embodiments of the invention, the method ends following Step 236.

Example

Figure 3A:
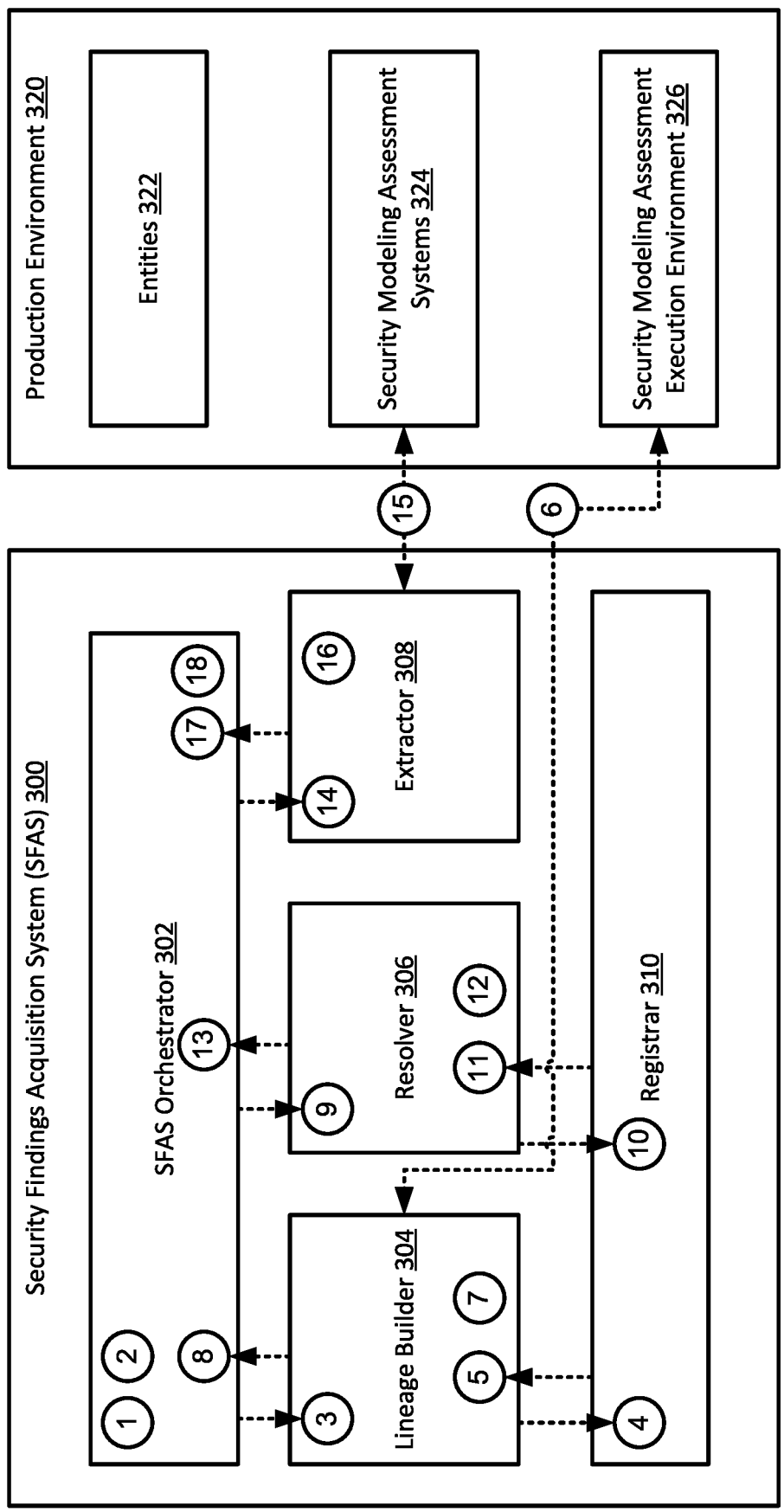
FIGS. 3A-3C show diagrams of the operation of an example system over time and example data structures generated by the example system in accordance with one or more embodiments of the invention.
Figure 3B:
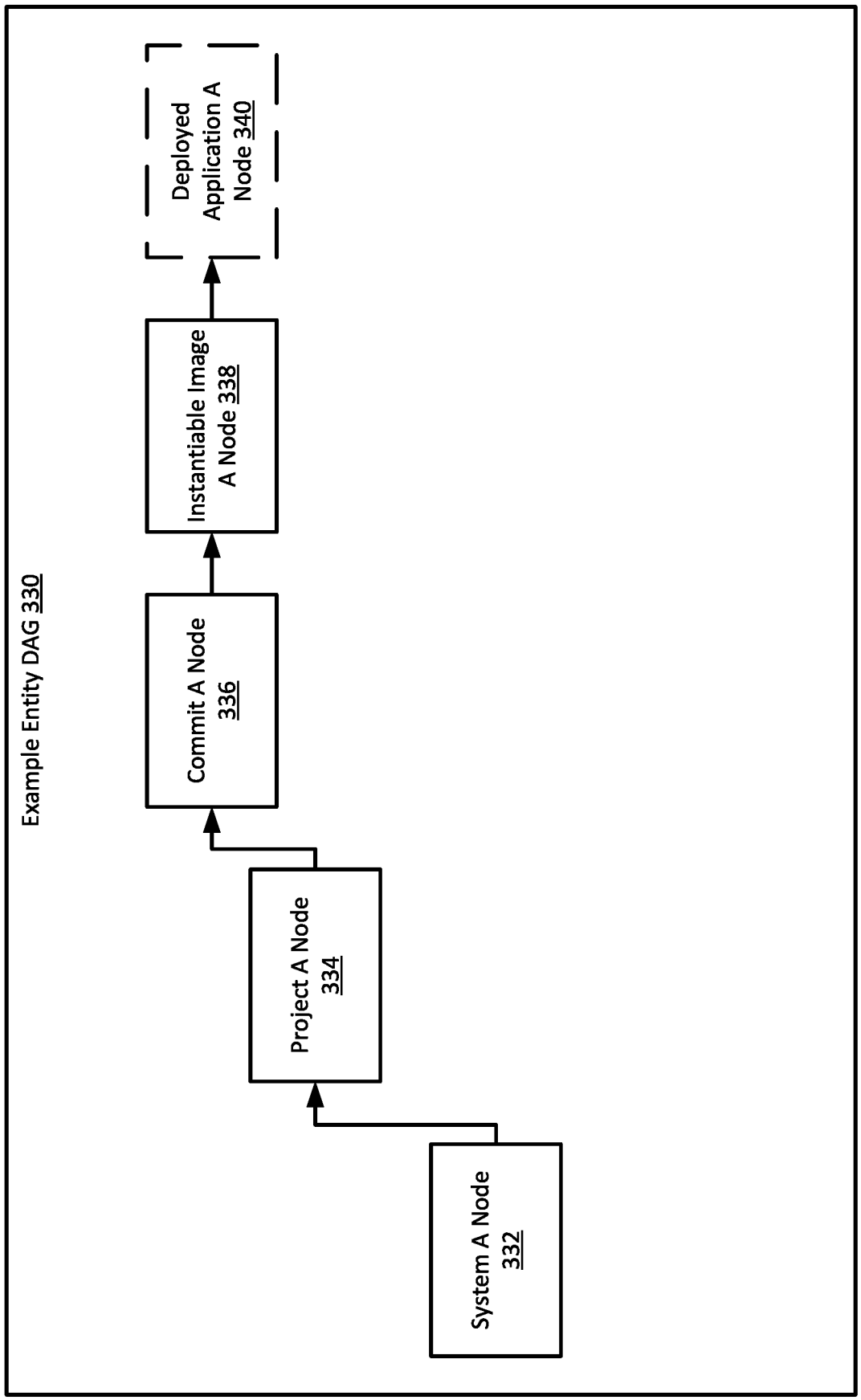
Figure 3C:
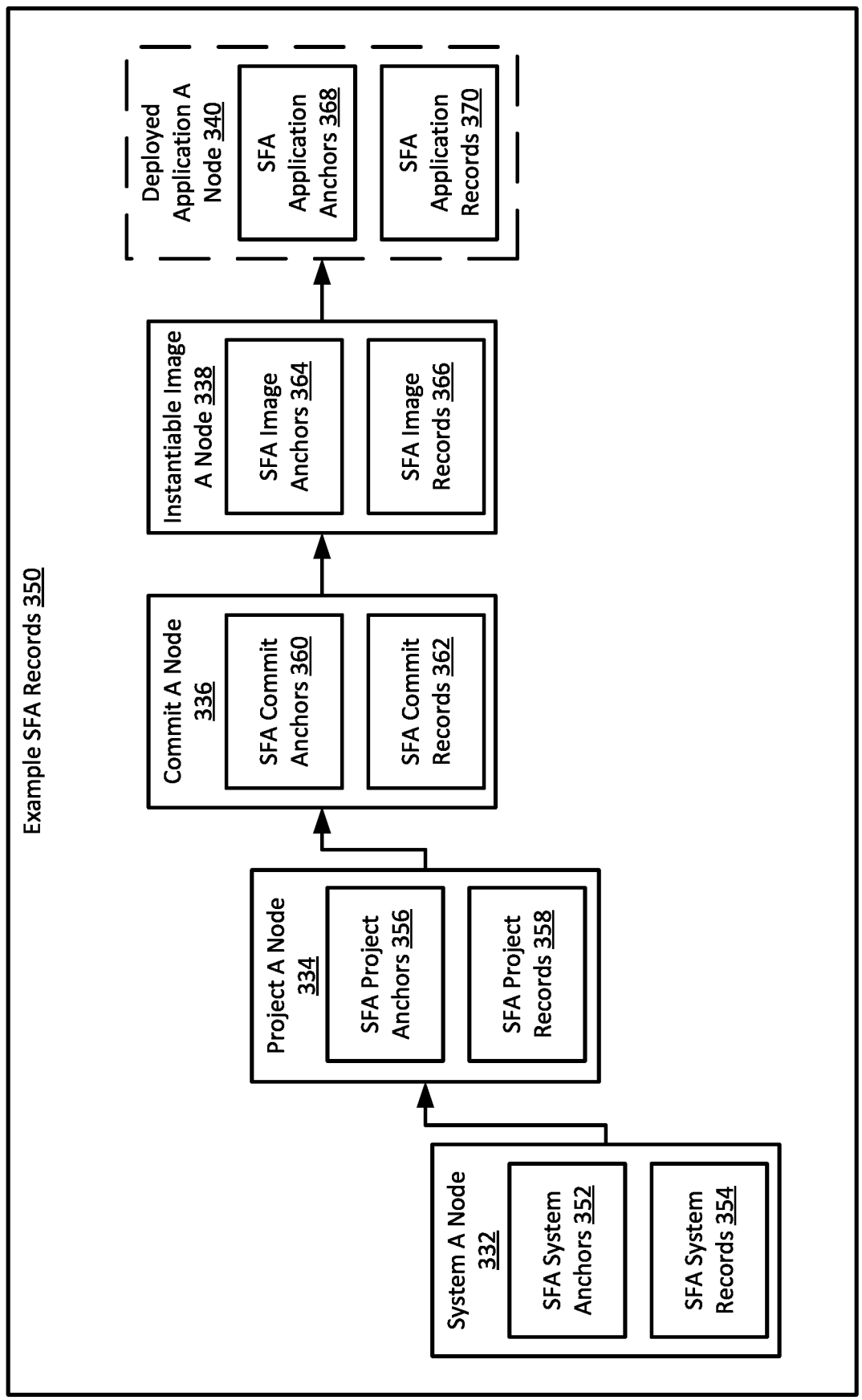

FIGS. 3A-3C show diagrams of the operation of an example system and data structures generated by the example system over time in accordance with one or more embodiments of the invention. The following example is for explanatory purposes only and not intended to limit the scope of embodiments described herein. Additionally, while the example shows certain aspects of embodiments described herein, all possible aspects of such embodiments may not be illustrated in this particular example. This example is intended to be a simple example to illustrate, at least in part, concepts described herein.

Referring to FIG. 3A, consider a scenario in which a user of a production environment wants to know the security information associated with an application executing in the production environment.

In such a scenario, an example system includes a security findings acquisition system (SFAS) (300). The SFAS (300) includes an SFAS orchestrator (302), a lineage builder (304), a resolver (306), an extractor (308), and a registrar (310). The SFAS (300) and its components (302, 304, 306, 308, 310) are operatively connected to the production environment (320). The production environment (320) includes entities (322), security modeling assessment systems (324), and a security modeling assessment execution environment (326).

At Step 1, the user of the system submits an entity context request to the SFAS orchestrator (302) of the SFAS (300). The entity context request includes entity context associated with the application for which the user wants to know the security information. At Step 2, the SFAS orchestrator uses the entity context to determine that the entity associated with the entity context request is not associated with an entity DAG. In response to the determination, at Step 3, the SFAS orchestrator (302) sends a request for an entity DAG and the entity context to the lineage builder (304). In response to obtaining the entity context and the request for the entity DAG, the lineage builder (304) at Step 4, sends a request to the registrar (310) for security modeling assessment execution environment connection data. In response to obtaining the request, the registrar (310) obtains the security modeling assessment execution environment connection data from an address book maintained by the registrar (310), and at Step 5, the registrar (310) provides the security modeling assessment execution environment connection data to the lineage builder (304). After obtaining the security modeling assessment execution environment connection data, at Step 6, the lineage builder (304) requests and obtains entity relationship data associated with the targeted entity from the security modeling assessment execution environment (326). At step 7, the lineage builder (304) generates an example entity DAG associated with the targeted entity using the obtained entity relationship data.

An example entity DAG (330) is depicted in FIG. 3B. The targeted entity, the deployed application, is associated with the deployed application A node (340) and is depicted with a dashed box. The remaining nodes of the example entity DAG (330) are associated with entities that correspond to previous stages of the lifecycle of the targeted entity (i.e., the deployed application). The nodes include instantiable image A node (338), commit A node (336) (i.e., committed computer instructions associated with deployed application A), project A node (334), and system A node (332).

Returning to example system depicted in FIG. 3A, at Step 8, the lineage builder (304) provides the entity DAG to the SFAS orchestrator (302). After obtaining the entity DAG, at Step 9, the SFAS orchestrator (302) sends the entity DAG and a request to generate SFA anchors to the resolver (306). In response to obtaining the entity DAG and the SFA anchors generation request, at Step 10, the resolver (306) sends a request to the registrar (310) for security modeling assessment systems connection data. In response to obtaining the request, the registrar (310) obtains the security modeling assessment systems connection data from an address book maintained by the registrar (310), and at Step 11, the registrar (310) provides the security modeling assessment systems connection data to the resolver (306). At step 12, the resolver generates the SFA anchors using the entity DAG and the obtained security modeling assessment systems connection data.

After generating the SFA anchors, at Step 13, the resolver (306) provides the SFA anchors to the SFAS orchestrator (302). At Step 14, the SFAS orchestrator (302) sends the SFA anchors and a request for SFA records to the extractor (308). In response to obtaining the SFA anchors and the request for SFA records, at Step 15, the extractor (308) obtains security assessment data associated with each entity included in the SFA anchors from the security modeling assessment systems (324) using the SFA anchors. After obtaining the security assessment data, at Step 16, the extractor (308) generates SFA records using the SFA anchors and the security assessment data. At step 17, the extractor (308) provides the SFA records to the SFAS orchestrator (302). In response to obtaining the SFA records, at Step 18, the SFAS orchestrator (302) performs a security action using the SFA records. The security action includes providing the SFA records to the user.

Example SFA records are depicted in FIG. 3C. The example SFA records (350) include the same nodes as the example DAG (330, FIG. 3B). The nodes of the SFA records now include SFA anchors and SFA records associated with each node. Accordingly system A node (332) includes SFA system anchors (352) and SFA system records (354) associated with system A, project A node (334), includes SFA project anchors (356) and SFA project records (358) associated with project A, commit A node (336), includes SFA commit anchors (360) and SFA commit records (362) associated with commit A, instantiable image A node (338), includes SFA image anchors (364) and SFA image records (366) associated with instantiable image A, and deployed application A node (340) includes SFA application anchors (368) and SFA application records (370) associated with deployed application A.

End of Example

Figure 4:
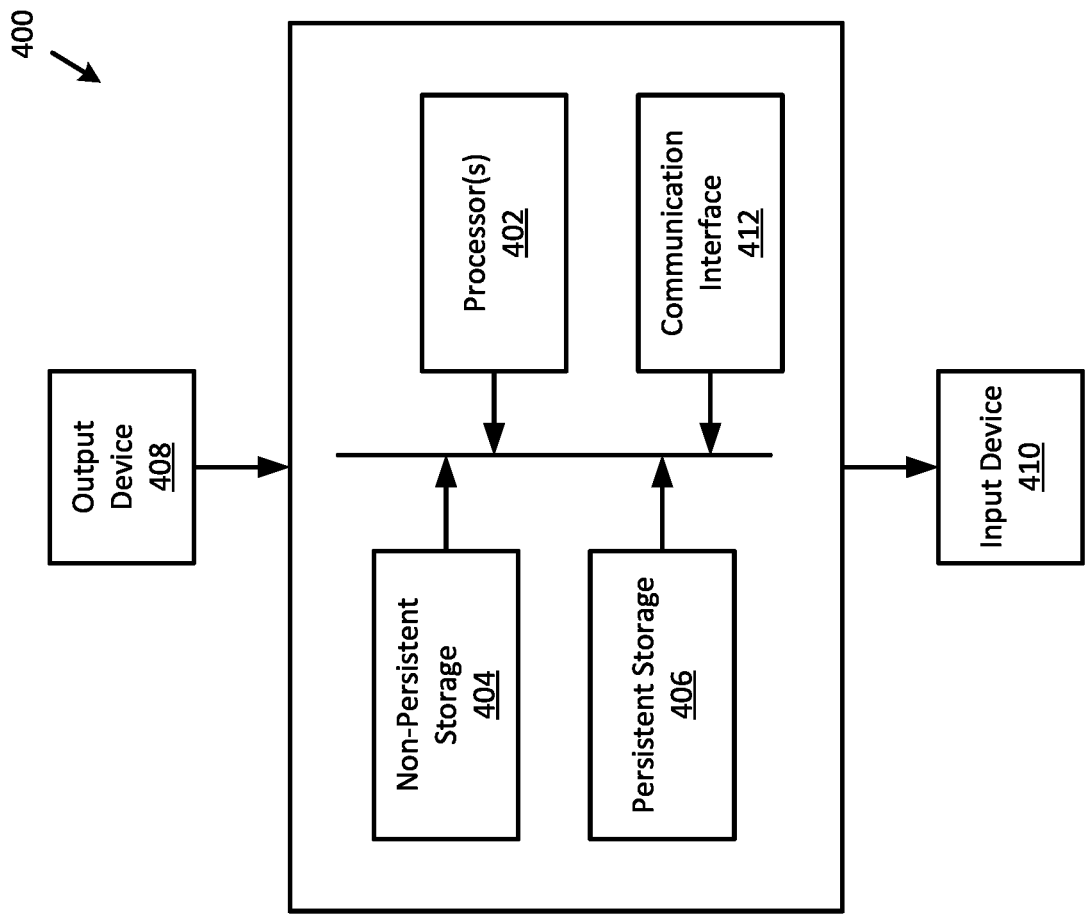
FIG. 4 shows a diagram of a computing device in accordance with one or more embodiments of the invention.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to generating SFA records that include security assessment data associated with an entity. The SFA records may include security assessment data associated with each stage in the lifecycle of an entity. As such, the SFA records may be efficiently generated and reliably indicate the security of an entity throughout its lifecycle.

Thus, embodiments of the invention may address the problem of inefficient use of computing resources to obtain security information associated with an entity. This problem arises due to the technological nature of the environment in which the entity is executed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for generating security findings acquisition (SFA) records, the method comprising:
   obtaining, by a security finding acquisition system (SFAS) orchestrator, an entity context request associated with an entity;
   in response to obtaining the entity context request:
      making a first determination, by the SFAS orchestrator, that the entity is not associated with an entity directed acyclic graph (DAG);
      in response to the first determination:
         obtaining, by the SFAS orchestrator, the entity DAG associated with the entity from a lineage builder;
         making a second determination, by the SFAS orchestrator, that the entity is not associated with SFA anchors;
         in response to the second determination:
            obtaining, by the SFAS orchestrator, the SFA anchors associated with the entity from a resolver, wherein obtaining the SFA anchors comprises:
               sending, by the SFAS orchestrator, an SFA anchor request and the entity DAG to the resolver;
               in response to obtaining the SFA anchor request and the entity DAG:
               obtaining, by the resolver, security modeling assessment system connection data from a registrar;
               generating, by the resolver, the SFA anchors using the security modeling assessment system connection data and the entity DAG; and
               providing, by the resolver, the SFA anchors to the SFAS orchestrator;
            obtaining, by the SFAS orchestrator, the SFA records associated with the entity from an extractor using the SFA anchors; and
            performing, by the SFAS orchestrator, security actions using the SFA records.

2. The method of claim 1, wherein obtaining, by the SFAS orchestrator, the SFA records associated with the entity from the extractor using the SFA anchors comprises:
   sending, by the SFAS orchestrator, a request for the SFA records associated with the entity and the SFA anchors to the extractor; and
   in response to obtaining, by the extractor, the request for the SFA records associated with the entity and the SFA anchors:

obtaining security assessment data from security modeling assessment systems using the SFA anchors;
generating the SFA records using the security assessment data; and
providing the SFA records to the SFAS orchestrator.

3. The method of claim 1, wherein the entity context request comprises entity context information associated with the entity, wherein the entity context information specifies the entity.

4. The method of claim 3, wherein the entity DAG comprises:
a plurality of nodes associated with related entities associated with the entity, and
a node of the plurality of nodes associated with the entity.

5. The method of claim 4, wherein the SFA records specify security assessment data associated with the plurality of nodes.

6. The method of claim 4, wherein obtaining, by the SFAS orchestrator, the entity DAG associated with the entity from the lineage builder comprises:
sending, by the SFAS orchestrator, an entity DAG request and the entity context information to the lineage builder;
in response to obtaining, by the lineage builder, the entity DAG request and the entity context information:
obtaining, by the lineage builder, security modeling assessment execution environment connection data from the registrar;
obtaining, by the lineage builder, entity relationship data associated with the entity from a security modeling assessment execution environment using the security modeling assessment execution environment connection data;
generating, by the lineage builder, the entity DAG using the entity relationship data; and
providing, by the lineage builder, the entity DAG to the SFAS orchestrator.

7. The method of claim 6, wherein the SFA anchors specify the security modeling assessment system connection data associated with the plurality of nodes.

8. The method of claim 1, wherein the registrar maintains an address book, wherein the address book comprises the security modeling assessment system connection data and the security modeling assessment execution environment connection data.

9. A non-transitory computer readable medium comprising computer readable program code, which when executed by a computer processor enables the computer processor to perform a method for generating security findings acquisition (SFA) records, the method comprising:
obtaining, by a security finding acquisition system (SFAS) orchestrator, an entity context request associated with an entity;
in response to obtaining the entity context request:
making a first determination, by the SFAS orchestrator, that the entity is not associated with an entity directed acyclic graph (DAG);
in response to the first determination:
obtaining, by the SFAS orchestrator, the entity DAG associated with the entity from a lineage builder;
making a second determination, by the SFAS orchestrator, that the entity is not associated with SFA anchors;
in response to the second determination:

obtaining, by the SFAS orchestrator, the SFA anchors associated with the entity from a resolver, wherein obtaining the SFA anchors comprises:
sending, by the SFAS orchestrator, an SFA anchor request and the entity DAG to the resolver, wherein, in response to obtaining the SFA anchor request and the entity DAG, the resolver:
obtains security modeling assessment system connection data from a registrar,
generates the SFA anchors using the security modeling assessment system connection data and the entity DAG, and
provides the SFA anchors to the SFAS orchestrator;
obtaining, by the SFAS orchestrator, the SFA records associated with the entity from an extractor using the SFA anchors; and
performing, by the SFAS orchestrator, security actions using the SFA records.

10. The non-transitory computer readable medium of claim 9, wherein obtaining, by the SFAS orchestrator, the SFA records associated with the entity from the extractor using the SFA anchors comprises:
sending, by the SFAS orchestrator, a request for the SFA records associated with the entity and the SFA anchors to the extractor; and
in response to obtaining, by the extractor, the request for the SFA records associated with the entity and the SFA anchors:
obtaining security assessment data from security modeling assessment systems using the SFA anchors;
generating the SFA records using the security assessment data; and
providing the SFA records to the SFAS orchestrator.

11. The non-transitory computer readable medium of claim 9, wherein the entity context request comprises entity context information associated with the entity, wherein the entity context information specifies the entity.

12. The non-transitory computer readable medium of claim 11, wherein the entity DAG comprises:
a plurality of nodes associated with related entities associated with the entity, and
a node of the plurality of nodes associated with the entity.

13. The non-transitory computer readable medium of claim 12, wherein the SFA records specify security assessment data associated with the plurality of nodes.

14. The non-transitory computer readable medium of claim 12, wherein obtaining, by the SFAS orchestrator, the entity DAG associated with the entity from the lineage builder comprises:
sending, by the SFAS orchestrator, an entity DAG request and the entity context information to the lineage builder;
in response to obtaining, by the lineage builder, the entity DAG request and the entity context information:
obtaining, by the lineage builder, security modeling assessment execution environment connection data from the registrar;
obtaining, by the lineage builder, entity relationship data associated with the entity from a security modeling assessment execution environment using the security modeling assessment execution environment connection data;
generating, by the lineage builder, the entity DAG using the entity relationship data; and providing, by the lineage builder, the entity DAG to the SFAS orchestrator.

15. The non-transitory computer readable medium of claim 14, wherein the SFA anchors specify the security modeling assessment system connection data associated with the plurality of nodes.

16. The non-transitory computer readable medium of claim 9, wherein the registrar maintains an address book, wherein the address book comprises the security modeling assessment system connection data and the security modeling assessment execution environment connection data.

17. A system, comprising:
   a production environment comprising entities; and
   a security findings acquisition system (SFAS) orchestrator of a SFAS, comprising a processor and memory, programmed to:
   obtain an entity context request associated with an entity of the entities;
   in response to obtaining the entity context request:
      make a first determination that the entity is not associated with an entity directed acyclic graph (DAG);
      in response to the first determination:
         obtain the entity DAG associated with the entity from a lineage builder;
         make a second determination that the entity is not associated with SFA anchors;
         in response to the second determination:
            obtain the SFA anchors associated with the entity from a resolver, wherein obtaining the SFA anchors comprises:
               send an SFA anchor request and the entity DAG to the resolver, wherein, in response to obtaining the SFA anchor request and the entity DAG, the resolver:
                  obtains security modeling assessment system connection data from a registrar,
                  generates the SFA anchors using the security modeling assessment system connection data and the entity DAG, and
                  provides the SFA anchors to the SFAS orchestrator;
         obtain the SFA records associated with the entity from an extractor using the SFA anchors; and
         perform security actions using the SFA records.

18. The system of claim 17, wherein obtaining the SFA records associated with the entity from the extractor using the SFA anchors comprises:
   sending, by the SFAS orchestrator, a request for the SFA records associated with the entity and the SFA anchors to the extractor; and
   in response to obtaining, by the extractor, the request for the SFA records associated with the entity and the SFA anchors:
      obtaining security assessment data from security modeling assessment systems using the SFA anchors;
      generating the SFA records using the security assessment data; and
      providing the SFA records to the SFAS orchestrator.

* * * * *